United States Patent

Castillo et al.

[11] Patent Number: 5,476,527
[45] Date of Patent: Dec. 19, 1995

[54] WHITE ATOXIC UREA FERTILIZER COMPOSITION

[75] Inventors: Jose R. Castillo, Los Teques; Manuel Mas, Caracas; Marilu Stea, Los Teques, all of Venezuela

[73] Assignee: Intevep, S.A., Caracas, Venezuela

[21] Appl. No.: 154,121

[22] Filed: Nov. 18, 1993

[51] Int. Cl.$^6$ .................................................. C05C 9/00
[52] U.S. Cl. .................................................. 71/29; 564/63
[58] Field of Search ........................ 71/28–30; 564/63

[56] References Cited

U.S. PATENT DOCUMENTS 5,049,180  9/1991  Frazier et al. ........................... 71/29

FOREIGN PATENT DOCUMENTS 622982   6/1961  Canada ..................................... 71/29
7109213  3/1971  Japan ...................................... 71/29
0715566  2/1980  Japan ...................................... 71/29
1289865  2/1987  U.S.S.R. .................................. 71/29

*Primary Examiner*—Ferris Lander
*Attorney, Agent, or Firm*—Bachman & LaPointe

[57] ABSTRACT

A fertilizer composition is provided which is characterized by high mechanical resistance, anti-caking properties, and a substantially white color, and which fertilizer includes urea and a hydrosoluble additive selected from the group consisting of phosphoric acid, solutions of phosphoric acid in water, and phosphoric acid containing compositions, the additive containing $P_2O_5$ in an amount sufficient to provide the fertilizer composition with a content of $P_2O_5$ by weight of the fertilizer composition of between about 0.2% to about 7.0% such that the fertilizer composition possesses high mechanical resistance and a low tendency to lumping while maintaining a substantially white color and without affecting the capacity of dissolution thereof.

18 Claims, No Drawings

WHITE ATOXIC UREA FERTILIZER COMPOSITION

BACKGROUND OF THE INVENTION

The invention relates to a process for producing a fertilizer composition and a fertilizer composition per se which is characterized by high mechanical resistance, anti-caking properties and a substantially white color, while maintaining a high capacity of dissolution.

A problem frequently encountered during the handling, transportation and storage of fertilizer is the tendency of the fertilizer to lump. Such fertilizers also tend to have prills exhibiting an unsatisfactory degree of hardness or resistance to fracturing.

It is common in the prior art to provide additives to the fertilizer to alter the manner of crystallization of the fertilizer during its production. U.S. Pat. Nos. 3,112,343, 4,160,782 and 4,204,053 disclose various processes for the treatment of fertilizers with additives such as formaldehyde in an effort to address the foregoing problems. However, formaldehyde has been designated by the U.S. Environmental Protection Agency as a toxic chemical and a potentially carcinogenic substance.

Accordingly, attempts have been made to treat fertilizer with other additives. For example, U.S. Pat. No. 4,587,358 discloses a fertilizer composition which uses lignosulphonates to improve the mechanical resistance and anti-caking properties of the fertilizer. U.S. Pat. No. 5,114,458 discloses the use of a hydrosoluble lignate salt additive derived from waste materials developed in paper pulp factories, also providing improved mechanical resistance and anti-caking properties of the fertilizer. These additives, however, tend to give the fertilizer a brownish color.

It is desirable to provide a fertilizer composition and method for making same which is characterized by high mechanical resistance and anti-caking properties which maintains a white or whitish color, and is at the same time non-toxic, non-carcinogenic, and relatively inexpensive to manufacture.

It is therefore the principal object of the present invention to provide a fertilizer composition and a process for producing same wherein the fertilizer is characterized by high mechanical resistance and anti-caking properties, and maintains a substantially white color.

It is another object of the invention to provide a fertilizer and process as aforesaid which is inexpensive, non-toxic, and non-carcinogenic.

Other objects and advantages will appear hereinbelow.

SUMMARY OF THE INVENTION

The foregoing objects and advantages are readily obtained by the present invention.

In accordance with the present invention, the fertilizer composition comprises urea and a hydrosoluble additive selected from the group consisting of phosphoric acid, solutions of phosphoric acid in water, and phosphoric acid containing compositions, the additive containing $P_2O_5$ in an amount sufficient to provide the fertilizer composition with a content of $P_2O_5$ by weight of the fertilizer composition of between about 0.2% to about 7.0% such that the fertilizer possesses high mechanical resistance and a low tendency to lumping while maintaining a substantially white color and without affecting the capacity of dissolution thereof. A preferred additive is urea-phosphate ($CO(NH_2)_2 \cdot H_3PO_4$).

The fertilizer preferably contains at least about 91 wt % urea.

The process for producing the fertilizer of the present invention comprises the steps of mixing urea and the additive in sufficient proportions so that the content by weight of $P_2O_5$ in the fertilizer composition is between about 0.2% to about 7.0%, the mixing step providing a substantially homogeneous mixture of urea and the additive; and processing the mixture so as to provide a fertilizer composition having a desired particulate material form. The mixing step is preferably carried out at a temperature of between about 130° C. to about 140° C. The processing step may be any conventional step, such as prilling, which is suitable to provide the desired particulate form.

DETAILED DESCRIPTION

The invention relates to a fertilizer composition which exhibits high mechanical resistance and anti-caking properties and has a substantially white color.

Conventional fertilizers are frequently treated or formulated with various additives to increase the mechanical resistance and anti-caking properties of the fertilizer. Such additives, however, cause problems ranging from discoloring the fertilizer to a brownish color to being toxic and/or carcinogenic in nature.

According to the invention, a fertilizer is provided having the aforesaid improved mechanical resistance and anti-caking properties without using toxic and/or carcinogenic materials and without altering the substantially white color of the fertilizer.

As used herein, anti-caking properties refer to the tendency of the fertilizer to lump. Such lumping is undesirable, and a fertilizer with high anti-caking properties is said to have a low tendency to lump. One method for measuring this property is to measure the force needed to break a pressure formed cake of the fertilizer. This is illustrated and described below in Example 1. A fertilizer is said to have a low tendency to lump if the breaking force of the cake, as measured in Example 1, is less than or equal to about 6 kg.

Also, the term mechanical resistance refers to the strength of a prill of fertilizer, and is measured by the force necessary to break such a prill. A high mechanical resistance is desirable, and the measurement of such force is illustrated below in Example 2. According to the invention, prills are provided having at least about 30% greater mechanical resistance as compared to prills of urea fertilizer without additives.

According to the invention, a fertilizer composition is provided having a hydrosoluble additive which provides the fertilizer with high mechanical resistance and anti-caking properties, while maintaining the substantially white color of the fertilizer. The additive is selected from the group consisting of phosphoric acid, solutions of phosphoric acid in water, and phosphoric acid containing compositions. The amount of additive to be used is based upon the content in the additive of $P_2O_5$, so as to provide the desired amount of $P_2O_5$ in the final fertilizer composition.

The fertilizer composition, in accordance with the invention, comprises a mixture of urea and the additive in proportions sufficient to provide a content by weight of $P_2O_5$ in the final fertilizer product of between about 0.2% to about 7.0%, preferably between about 0.3% to about 2.0%. The additive in these amounts does not affect the capacity of the fertilizer toward dissolution.

Urea comprises the substantial remaining portion of the fertilizer, which fertilizer preferably has a content of urea by weight of at least about 91%.

The phosphoric acid containing additive of the present invention is preferably urea-phosphate ($CO(NH_2)_2 \cdot H_3PO_4$), which is preferred because it is typically readily available in many fertilizer processing plants, and also because it provides a relatively safe, simple and inexpensive form for handling the phosphoric acid. Of course, any hydrosoluble phosphoric acid containing composition could suitably be used and, as set forth above, pure phosphoric acid may suitably be added directly, if desired, or in aqueous solutions preferably having a concentration of acid by weight of between about 20% to about 85%. Such a fertilizer composition is characterized by a high mechanical resistance and also by good anti-caking properties, as set forth in the examples below, and also maintains a desirable white or whitish color. Further, the fertilizer composition is prepared without toxic or carcinogenic additives such as formaldehyde, and is relatively inexpensive and simple in manufacture.

According to the invention, the fertilizer is prepared as follows. A stream of molten urea is provided. The molten urea stream may suitably be the molten urea line of a urea plant. The urea may be obtained, for example, either before the evaporation system, or between two evaporation systems of the urea plant. Any other source of molten urea is, of course, acceptable. For example, the urea stream could be provided from a pure granular urea composition initially subjected to a melting step.

According to the invention, the additive is added to the molten urea stream in amounts sufficient to provide a content by weight of $P_2O_5$ in the fertilizer composition of between about 0.2% to about 7.0%, preferably between about 0.3% to about 2.0%.

As set forth above, the additive may be in the form of pure phosphoric acid or aqueous solutions thereof, or any phosphoric acid containing composition such as urea-phosphate, so as to provide the desired content of $P_2O_5$ in the final fertilizer composition. In this regard, it has been found that the improved properties are further improved as the content of $P_2O_5$ is increased, up to about 7.0% by weight, after which the benefits of any further increase do not justify the added expense of more additive.

Furthermore, at higher levels of $P_2O_5$, particularly at levels higher than about 8% by weight, urea-phosphate does not reduce caking characteristics of the urea or the final fertilizer composition. Rather, an inhibition of the effect of the additive is observed.

The molten urea and additive are mixed, preferably at a temperature of between about 130° C. to about 140° C., so as to provide a substantially homogeneous mixture of urea and additive. The mixture is then treated by well known processes such as prilling and/or granulation so as to provide the final particulate material form.

The following examples demonstrate the improved characteristics of the fertilizer formulated according to the invention.

EXAMPLE 1

This example demonstrates the anti-caking properties of fertilizers formulated according to the invention as compared to fertilizer without additive and to fertilizer prepared with a formaldehyde additive (UF-85).

A sample of each fertilizer was subjected to a compressive force of 10 kg for a period of 7 days, resulting in a cake being formed from each sample. The force necessary to break each cake was measured. A breaking force of equal to or less than about 6 kg is considered good as an indicator of anti-caking properties. The results are set forth below in Table 1.

TABLE 1

| ADDITIVE | QUANTITY OF ADDITIVE IN FINAL COMP. (WT %) | % $P_2O_5$ IN FINAL COMP. (WT %) | BREAKING FORCE (kg) US STANDARD MESH | | | ANTI-CAKING TENDENCIES |
|---|---|---|---|---|---|---|
| | | | 8 | 10 | 12 | |
| NONE | 0.0 | 0.0 | 7 | 8 | 10 | CAKES |
| UREA-PHOSPHATE | 1.0 | 0.44 | 5 | 5 | 5 | DOES NOT CAKE |
| UREA-PHOSPHATE | 1.5 | 0.66 | — | — | 5 | DOES NOT CAKE |
| UF-85 | 0.5(*) | | — | — | 5 | DOES NOT CAKE |

(*) providing 0.3 wt % formaldehyde in final composition for UF-85

As shown, fertilizers produced according to the invention possess excellent anti-caking properties.

EXAMPLE 2

This example demonstrates the improved mechanical resistance or strength of prills of the fertilizer formulated according to the invention. The force necessary to break a prill of several samples of fertilizer was measured in accordance with test #IFDC.S-115, set forth in the Manual for Determining Physical Properties of Fertilizers, International Fertilizer Development Center, by D. W. Rutland, Sep. 1986. The results are set forth below in Table 2.

TABLE 2

| | | COMPRESSION TEST | | | | | |
|---|---|---|---|---|---|---|---|
| ADDITIVE | QUANTITY OF ADDITIVE IN FINAL COMP. (WT %) | % $P_2O_5$ IN FINAL COMP. (WT %) | PRILL HARDNESS (kg) US STANDARD MESH | | | | AVERAGE INCREASE IN RESISTANCE TO COMPRESSION |
| | | | 8 | 10 | 12 | 14 | |
| NONE | 0.0 | 0.0 | 1.15 | 0.95 | 0.68 | 0.51 | — |
| UREA-PHOSPHATE | 1.0 | 0.45 | 1.49 | 1.12 | 0.92 | 0.68 | 32% |
| UREA-PHOSPHATE | 1.5 | 0.68 | 1.54 | 1.19 | 0.92 | 0.69 | 36% |
| UF-85 | 0.5(*) | — | 1.32 | 1.18 | 0.91 | 0.60 | 23% |

(*) providing 0.3 Wt % formaldehyde in final composition

As shown, fertilizers formulated according to the invention provide an average increase to mechanical resistance of greater than 30% as compared to non-treated urea. Fertilizers formulated according to the invention also favorably compare to UF-85.

Thus disclosed is a fertilizer composition and a process for preparing same which provides an increase in mechanical resistance and anti-caking properties while maintaining a substantially white color without the use of toxic or carcinogenic additives.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for preparing a fertilizer composition having high mechanical resistance, anti-caking properties and a substantially white color, comprising the steps of: mixing urea and a hydrosoluble additive selected from the group consisting of phosphoric acid, solutions of phosphoric acid in water, and phosphoric acid containing compositions, the additive being present in the fertilizer composition in final form and containing $P_2O_5$ sufficient to provide the fertilizer composition with an amount of $P_2O_5$ by weight of the fertilizer composition of between about 0.2% to about 7.0%, the mixing step providing a substantially homogeneous mixture of urea and the hydrosoluble additive; and processing the mixture so as to provide a fertilizer composition having a desired particulate material form.

2. A process according to claim 1, further including providing the additive containing $P_2O_5$ in an amount by weight of the fertilizer composition of between about 0.3% to about 2.0%.

3. A process according to claim 2, wherein the mixing step is carried out at a temperature sufficient to provide molten urea.

4. A process according to claim 2, wherein the mixing step is carried out at a temperature of between about 130° C. to about 140° C.

5. A process according to claim 2, wherein the mixing step includes the steps of providing a stream of molten urea and adding the additive to the stream of molten urea.

6. A process according to claim 2, wherein the additive is urea-phosphate.

7. A process according to claim 6, wherein said processing step yields said fertilizer composition which in final form contains urea-phosphate containing between about 0.2% to about 7.0% $P_2O_5$ by weight of said fertilizer composition.

8. A process according to claim 6, wherein said processing step yields said fertilizer composition consisting essentially of urea and urea-phosphate, and wherein said fertilizer composition in final form contains at least about 91% by weight urea and containing urea-phosphate between about 0.2% to about 7.0% by weight of said fertilizer composition.

9. A process according to claim 2, wherein the additive is an aqueous solution of phosphoric acid having a concentration by weight of the aqueous solution of between about 20% to about 85%.

10. A process according to claim 2, further including providing urea in an amount sufficient to provide the fertilizer composition with a content of the fertilizer composition of urea by weight of at least about 91%.

11. The product prepared by the process of claim 1 and characterized by possessing a high mechanical resistance and a low tendency to lumping while maintaining a substantially white color and without affecting the capacity of dissolution thereof.

12. A fertilizer composition according to claim 11, wherein the fertilizer composition has a content of urea by weight of the fertilizer composition of at least about 91%.

13. A fertilizer composition according to claim 11, wherein the additive is urea-phosphate.

14. A fertilizer composition according to claim 13, wherein said fertilizer composition in final form contains urea-phosphate containing between about 0.2% to about 7.0% $P_2O_5$ by weight of said fertilizer composition.

15. A fertilizer composition according to claim 11, wherein the additive is an aqueous solution of phosphoric acid having an acid concentration by weight of the aqueous solution of between about 20% to about 85%.

16. A fertilizer composition according to claim 11, wherein the fertilizer composition is further characterized by a breaking force of less than or equal to about 6 kg.

17. A fertilizer composition according to claim 11, wherein prills of the fertilizer exhibit an increase in resistance to compression of at least about 30% as compared to non-treated prills of urea.

18. A fertilizer composition according to claim 11, wherein the fertilizer composition contains $P_2O_5$ in an amount by weight of the fertilizer composition of between about 0.3% to about 2.0%.

* * * * *